United States Patent Office 2,730,531
Patented Jan. 10, 1956

2,730,531

AMIDES OF EPOXYAMINES

George B. Payne, Albany, and Curtis W. Smith, Berkeley, Calif., assignors to Shell Development Company, Emeryville, Calif., a corporation of Delaware No Drawing. Application March 3, 1953,
Serial No. 340,162

5 Claims. (Cl. 260—348)

This invention relates to new compositions of matter and to processes for their preparation. More particularly, the present invention relates to a new class of nitrogen-containing epoxy compounds, to polymers, especially condensation polymers of these new compounds, and to the utilization of these compounds and their polymers for a number of different purposes for which they are especially suited.

An important object of the invention is the provision of a novel class of amides of epoxyamines and carboxylic acids. A special object is to provide polyepoxy amides of this new type. Another object of the invention is the production of homopolymers and copolymers of N-epoxyhydrocarbyl amides. Condensation polymers of polyepoxy amides of this kind derived from polybasic carboxylic acids are another special object of the invention. Still another object is the provision of an especially advantageous method of producing these new compounds. A further object of the invention is the provision of insecticidal and fungicidal compositions containing the new epoxy amides. Another object is the production of resinous and fibrous compositions comprising these compounds. Still further objects and advantages of the invention will become apparent from the following description of certain preferred forms of the new compounds which are intended to be illustrative of the invention without limiting its scope.

The compounds provided by the present invention are characterized by containing in their structure an epoxy oxygen atom linked to vicinal carbon atoms of a hydrocarbon radical which is directly attached to a nitrogen atom of a carboxylic acid amide. Due to the spatial arrangement of the functional groups in these new compounds, especially the location of an amido nitrogen atom between the reactive epoxy group and the amido carbonyl group, these epoxy amides possess unique and advantageous properties that make them distinctive from compounds hitherto known. Their novel structure gives them special utility in a variety of commercially important applications.

In an especialy advantageous embodiment of the invention the new compounds correspond to amides of epoxy primary amines containing two to eighteen carbon atoms per molecule. Preferred amides have not more than two, and more preferably not more than one, carbon atoms intervening between the epoxy group,

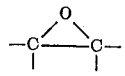

and the amido nitrogen atom to which it is linked. A particularly useful subgroup of the new epoxy compounds is the N-epoxyalkyl amides of carboxylic acids having one to eighteen, more preferably two to six, carbon atoms in the carboxylic acid radical of the molecule. A general formula for the new amides of epoxy amines is

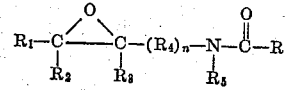

where R represents the radical remaining after removal of a carboxyl group from a carboxylic acid

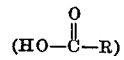

$R_1$, $R_2$, $R_3$ and $R_5$ represent hydrogen or hydrocarbon radicals; $R_4$ is a divalent hydrocarbon radical, and $n$ is an integer which can be zero, one or greater. In this formula any two of the R's can together represent a polyvalent hydrocarbon radical which will be trivalent when one of the two R's so combined is $R_4$ but otherwise will be a divalent hydrocarbon radical. Typical examples of the epoxy amides thus represented are the following derivatives of monobasic carboxylic acids:

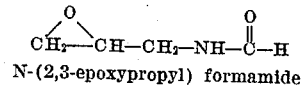

N-(2,3-epoxypropyl) formamide

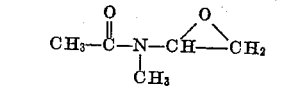

N-methyl-N-epoxyethyl acetamide

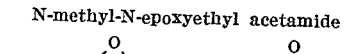

N-(3-methyl-2,3-epoxybutyl) acetamide

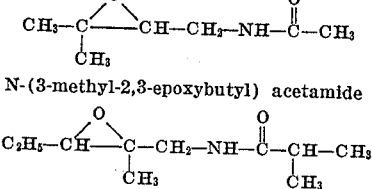

N-(2-methyl-2,3-epoxypentyl) isobutyramide

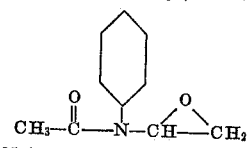

N-(epoxyethyl) acetanilide

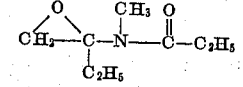

N-methyl-N-(1-ethylepoxyethyl) propionamide

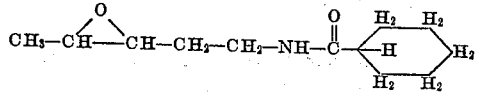

N-(3,4-epoxypentyl) cyclohexane carboxamide

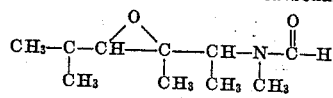

N-methyl-N-(1,2,4-trimethyl-2,3-epoxypentyl) formamide

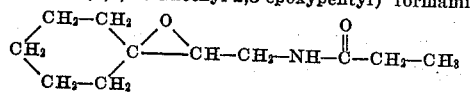

2-propionamidomethyl-1-oxaspiro[2.5] octane

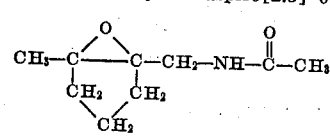

1-methyl-2-acetamidomethyl-1,2-epoxycyclopentane

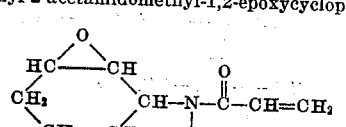

N-methyl-N-(2,3-epoxycyclohexyl) acrylamide

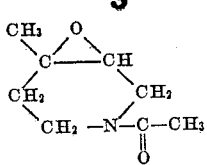
1-acetyl-4-methyl-3,4-epoxypiperidine

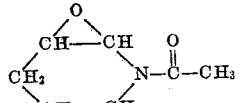
1-acetyl-2,3-epoxypiperidine

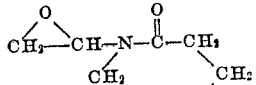
N-(epoxyethyl) omega-caprolactam

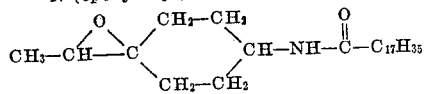
2-methyl-6-stearamido-1-oxaspiro[2.5] octane

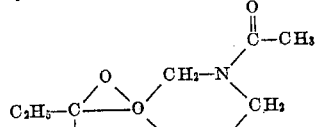
2-methyl-2-ethyl-5-acetyl-1-oxa-5-azaspiro[2.5] octane

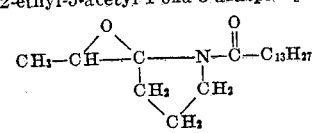
2-methyl-4-myristoyl-1-oxa-4-azaspiro[2.4] heptane

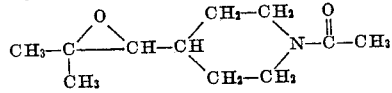
1acetyl-4-(2'-methyl-1',2'-epoxypropyl) piperidine

The new epoxy amides can contain more than one epoxy group. In such cases the epoxy groups can be attached to the same or different hydrocarbon chains linked directly to the amido nitrogen atom or atoms. Examples of these compounds are amides of polyepoxy primary amines such, for instance, as

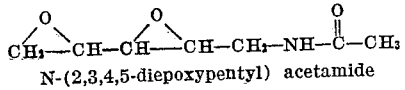
N-(2,3,4,5-diepoxypentyl) acetamide

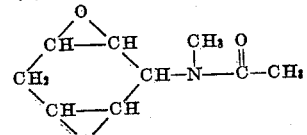
N-methyl-N-(2,3,5,6-diepoxycyclohexyl) acetamide and the like, and amides of diepoxy secondary amines of which

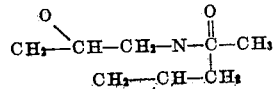
N,N-di(2,3-epoxypropyl) acetamide and

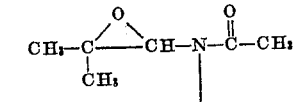
N-(3-methyl-2,3-epoxypropyl)-N-(3,4-epoxybutyl) acetamide are typical.

The amides of epoxy amines with polybasic acids, especially those derived from polybasic carboxylic acids having two to eight carbon atoms per molecule, are another useful subclass of the compounds of the invention. These can contain a single epoxy group as is the case with the new compounds

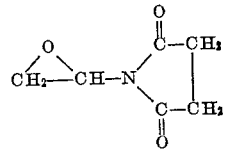
N-(epoxyethyl) succinimide and

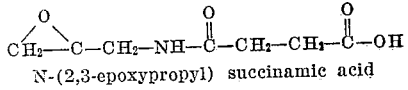
N-(2,3-epoxypropyl) succinamic acid for example. However, those having a plurality of epoxy groups in the molecule have special advantages because of the useful polymers which they form. For the production of resins and fibers we prefer to use polyepoxy polyamides of this type, the N,N'-di(2,3-epoxypropyl) amides being particularly advantageous. Suitable polybasic acid polyamides are, for example, N,N'-di(2,3-epoxypropyl) oxamide, N,N'-di(2-methyl-2,3-epoxypropyl) oxamide, N,N'-di(2,3-epoxybutyl) succinamide, and the like. Instead of such symmetrical epoxy amides, one can use unsymmetrical amides of polybasic acids such as N-(2,3-epoxypropyl)-N'-(2-methyl-2,3-epoxypropyl) oxamide and the like in the same way.

The new epoxy amides may be produced in a variety of different ways. One suitable method is reaction of amides of vicinal hydroxy-halo-substituted amines under controlled basic conditions to split off hydrogen halide and form the desired epoxy group. It is generally preferable, however, to produce the new compounds by epoxidizing the corresponding amides of olefinic amines.

The epoxidation of amides of olefinic amines is advantageously carried out by reaction with an epoxidizing agent at a temperature of about −20° C. to about 60° C., preferably between about 10° C. and 40° C. Organic peracids, such as peracetic, perbenzoic, monoperphthalic and like acids, are usually effective epoxidizing agents for reaction in this way. It is preferable to carry out the reaction in a suitable mutual solvent for the reactants and product. Chloroform is an especially useful solvent for this purpose, but ethyl ether, dichloromethane, benzene, ethyl acetate, etc. are also suitable. It is not necessary to operate under anhydrous conditions but the amount of water present should be limited so as to avoid excessive hydrolysis of the epoxy amide to dihydroxy amide. Up to 25% water in the reaction mixture can be used. For the preparation, via epoxidation, of epoxy amides in which the amido nitrogen atom is directly linked to the epoxy group it is advantageous to use as the starting amides of olefinic amines those having all three of the bonds of the amido nitrogen atom directly attached to carbon atoms because of the greater stability of substituted amides of this type. Examples of such suitable substituted amides of alpha,beta-olefinic amines are, for instance, N-vinyl succinimide, N-vinyl acetanilide, N-vinyl-omega-caprolactam, N-propenyl-N-ethyl benzamide, and the like.

As previously indicated, the new amides of epoxy amines are particularly useful in the form of their polymers, especially the polymers of the polyepoxy amides. Depending upon the degree of polymerization, the polymers range in consistency from mobile or viscous liquids to solid resinous materials. Those having an epoxy equivalency greater than one are capable of curing to infusible resins, the epoxy equivalency being the average number of epoxy groups contained in the average molecule. This value is obtained by dividing the average molecular weight of the polyamides of epoxy amines by the epoxide equivalent weight thereof.

Condensation polymers of the new amides of epoxy amines are obtained by subjecting them to an epoxide-coupling reaction which can advantageously be carried out in the presence of a so-called Friedel-Crafts catalyst such as aluminum chloride, aluminum bromide, bismuth trichloride, zinc chloride, boron trifluoride, silicon tetrachloride, stannic chloride, and the like. Among these catalysts, stannic chloride has been found to be especially effective. About 1% to 10% of catalyst is usually sufficient to effect the desired degree of polymerization. Since the polymerization reaction may become quite violent unless properly controlled, it is advantageous to carry out the reaction in the presence of a solvent. Petroleum ether boiling 35° C. to 60° C. is quite suitable for this purpose since it is effective in controlling the temperature and dissipating the heat of polymerization when the reaction is carried out under refluxing conditions, for example. Other inert solvents such as chloroform, benzene, isopropyl ether, etc. can be used, however. Ordinarily, the solvent is used in an amount such as to give a concentration of the amide of an epoxy amine which is to be polymerized of about 10% to about 50% concentration.

As a rule, temperatures of about −50° C. to about 100° C. are suitable for effecting epoxide coupling with the new compounds. The character of the resulting polymer will depend upon the particular temperature chosen. In general, polymerization at or below atmospheric temperatures (about 20° C.) will give waxy solids while higher temperatures tend to give viscous liquids. Preferred temperatures are in the range of about 0° C. to 60° C. Most preferably, the polymerization is carried out, at least initially, to form epoxide-coupled linear polymers which are soluble in organic solvents. In this form the polymers can be used in many ways.

One of these uses is as a component in coating compositions wherein a solution of the polymers, for instance, in a lower alcohol such as methanol or ethanol, or in lower ketones such as acetone or butanone or in hydrocarbons such as pentane, hexane or benzene, is applied, if desired together with other surface coating compounds, to the surface of an article, the solvent is permitted to evaporate and the polymer subjected to additional polymerization which converts it to the insoluble and infusible form providing an extremely resistant protective coating for the article. Alternatively, the initial epoxide-coupled polymer of the new amides of an epoxy amine can be further polymerized in molding operations to produce valuable form-stable molded articles. Compression injection or transfer molding can be carried out using pressures of the order of 100 to 3000 p. s. i. or more. The polymers can be introduced in such molding operations as viscous liquids or in solid form such as powder, chips or pellets which are fused during molding so as to form a coherent mass which is converted to the insoluble and infusible form before removal from the mold. The soluble and fusible form of the polymers is also suitable for preparing laminated articles by impregnating paper, cotton or other fabrics and then curing individually or as an assembly of superimposed sheets.

The properties of the polymers can be altered by copolymerizing them with other compounds. Thus, copolymers of two or more different amides of the same or different epoxy amines can be polymerized together, or one or more amides of an epoxy amine can be copolymerized with one or more different epoxy compounds or with other types of compounds polymerizable therewith. Examples of such epoxy compounds are, for instance, ethylene oxide, propylene oxide, isobutylene oxide, epichlorhydrin, vinyl cyclohexene dioxide, butadiene mono- or dioxide, epoxy ethers such as diglycidyl ether, resorcinol diglycidyl ether, and the like. Especially advantageous among compounds of this type are the glycidyl polyethers described in U. S. Patent 2,548,447 since these form copolymers with the new epoxy amides of the present invention, which copolymers have outstanding properties with respect to physical and adhesive strength.

In forming copolymers by condensation polymerization of the new amides of epoxy amines, it has also been found feasible to react these amides, preferably the polyepoxy amides, with other polyfunctional compounds. Thus, for example, polyhydric alcohols such as ethylene glycol, glycerol, pentaerythritol, sorbitol, diethylene glycol, resorcinol, hydroquinone, etc., polybasic acids, for instance, oxalic, malonic, succinic, glutaric, adipic, pimelic acids and diglycolic or hydroxy acids, typical of which are glycolic, lactic, the hydroxybutyric, tartaric and like acids, can be used. One may similarly use polymercaptans such as 1,2-ethanedithiol, 1,6-hexanedithiol, dithiohydroquinone, etc., polyamines such as ethylene diamine, 1,6-diaminocyclohexane, meta-phenylenediamine and the like, or hydroxy-substituted amines or mercaptans, as hydroxyethyl mercaptan, ethanolamine, etc. Amino acids are another type of polyfunctional compounds which can be successfully reacted with the new amides of epoxyamines to form valuable condensation polymers. Examples of suitable compounds of this group are, for instance, glycine, alanine, serine, phenylalanine, tyrosine, etc.

Copolymerization with the foregoing compounds can be successfully carried out in the same manner as homopolymerization of the compounds of the invention. In such copolymerization either two or more different monomers can be used or a mixture of one or more monomers with one or more partial polymers of the other polymerizable component can be used as starting material, or partial polymers of the two or more different types of starting monomers can be polymerized together to form the copolymers. Particularly useful copolymers are obtained, for example, by copolymerizing the new amides of epoxy amines or their partial polymers with partial polymers of polyglycidyl ethers of polyhydric alcohols, particularly those of dihydric phenols, having an epoxy equivalent between 1.0 and 2. Whatever the combination of starting materials used in preparing the new copolymers, it is desirable that they contain from about 5% to about 95% of amide of epoxy amine or its partial polymer.

For the preparation of polymers or copolymers the amides of olefinic carboxylic acids and epoxy amines constitute an especially advantageous sub-group of the new compounds of the invention because they can be polymerized not only by epoxy-coupling as previously described but also by addition polymerization through the olefinic bonds in the acid chain. Examples of compounds of this type which have been found suitable are, for instance, N-(2,3-epoxypropyl) acrylamide, N-(2-methyl-2,3-epoxypropyl) crotonamide, N-(2,3-epoxypropyl) oleamide, N,N'-di(2,3-epoxypropyl) maleamide, and the like.

In preparing polymers or copolymers from this advantageous subgroup of the new compounds it is often desirable to subject them first to the epoxide-coupling reaction and then complete the polymerization of the resulting polymer by addition polymerization. The reverse procedure can, however, be carried out successfully. Thus, the linear polymer obtained by addition polymerization can be subjected to epoxide-coupling, for instance by baking, if desired without a catalyst, to effect epoxide-coupling and produce a substantially insoluble and infusible polymer. Temperatures of the order of about 150° C. to 300° C. are generally suitable for such baking.

The addition polymerization of the amides of olefinic carboxylic acids and epoxy amides is aided by the presence of a peroxide polymerization catalyst such as benzoyl peroxide, acetyl peroxide, benzoyl acetyl peroxide, tertiary butyl perbenzoate, lauryl peroxide, dibutyryl peroxide, succinyl peroxide, tertiary allyl peroxides as tertiary hydroperoxide, etc., di(tertiary alkyl) peroxides such as di(tertiary butyl) peroxide, etc., peracetic acid, perphthalic acid, and the like. About 0.1% to 10% of peroxide catalyst is usually sufficient and temperatures of 50° C. to about 300° C. are generally effective. The addition polymerization can be carried out in the presence of other polymerizable compounds containing olefinic linkages, particularly a vinylidene group as in styrene, acrylonitrile, vinyl chloride, vinyl acetate, methyl methacrylate, diallyl phthalate, and the like. The amount of such polymerizable compound in admixture with the amides of olefinic carboxylic acids and epoxy amines or partial polymers thereof being copolymerized can vary within the limits of about 5% to 95% depending upon the properties desired in the resulting copolymer.

Instead of polymers, the new compounds can be converted to other derivatives by reaction with compounds containing reactive

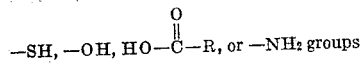

The following examples illustrate, in more detail, suitable methods of producing the new compounds of the invention and show some of their advantageous properties.

*Example I*

To a solution of 174 g. (0.89 mole) of N,N'-dimethallyloxamide prepared from ethyl oxalate and methallylamine (M. P. 140° C.–141° C.) in 1200 ml. of chloroform was added 240 g. (2.0 moles) of 45% peracetic acid which had been prepared by the method of Greenspan, Ind. Eng. Chem. 39, 847 (1947). The reaction mixture was stored in the cold for four days and then at room temperature for seven hours. The mixture was washed with two 800 ml. portions of water, dilute carbonate solution, and again with water. After filtering through anhydrous sodium sulfate, the chloroform was removed on the steam bath to a low volume. Addition of ether caused precipitation of the product, N,N'-di(2-methyl-2,3-epoxypropyl) oxamide. There was thus obtained 138 g. (68% yield based on starting amide) of material melting at 132° C.–133° C. Recrystallization from methanol gave 110 g. (M. P. 134° C.–135° C.).

Under the same conditions N,N'-dicrotyladipamide is converted to N,N'-di(2,3-epoxybutyl) adipamide, and N-(9,10-octadecyl) stearamide is obtained from N-oleyl stearamide.

*Example II*

N,N'-diallyloxamide (prepared by the method of Gluud, J. Chem. Soc. 103, 942 (1913)) was reacted with peracetic acid under the conditions of Example I. A 40% conversion to the diepoxide (M. P. 142° C.–144° C.) was obtained.

In the same way N-methallyl stearamide gives the corresponding monoepoxide, N-(2-methyl-2,3-epoxypropyl) stearamide.

*Example III*

N-methyl-N-cyclohexen-2-yl-acetamide is epoxidized by reaction with peracetic acid in chloroform solution at 20° C., using a 1.1:1 mole ratio of peracid to the olefinic amide. The resulting N-methyl-N-(2,3-epoxycyclohexyl) acetamide is recovered by the method used in Example I.

Further examples of amides of olefinic amines which can be used as starting materials for the epoxidation to new compounds of the invention are, for instance, N,N'-di(3-methyl-2-butenyl) malonamide giving N,N'-di(3-methyl-2,3-epoxybutyl) malonamide, N-(2-methyl-2-pentenyl) isobutyramide which gives N-(2-methyl-2,3-epoxypentyl) isobutyramide, N-vinyl acetanilide giving N-epoxyethyl acetanilide, N-methyl-N-(1-ethylvinyl) propionamide which gives N-methyl-N-(1-ethyl epoxyethyl) propionamide, N-methyl-N-(3-pentenyl) cyclohexane carboxamide giving N-methyl-N-(3,4-epoxypentyl) cyclohexane carboxamide, N-isopropyl-N-(1,2-dimethylbutyl) formamide giving N-isopropyl-N-(1,2-dimethyl-2,3-epoxybutyl) formamide, N-(2-cyclohexylidene ethyl) propionamide which gives 2-propionamidomethyl-1-oxaspiro[2.5] octane, 1-methyl-2-acetamidomethyl-2-cyclopentene-1 giving 1-methyl-2-acetamidomethyl-1,2-epoxycyclopentane, N-ethyl-N-(2-cyclohexenyl) acrylamide giving N-ethyl-N-(2,3-epoxycyclohexyl) acrylamide, 1-acetyl - 4 - methyl - 1,2,3,6 - tetrahydropyridine which gives 1 - acetyl - 4 - methyl - 3,4 - epoxypiperidine, N-vinyl omega-caprolactone giving N-epoxyethyl omega-caprolactone, 1-acetyl-4-isobutenylpiperidine which gives 1 - acetyl - 4 - (2' - methyl - 1',2' - epoxypropyl) piperidine, N-(2,4-pentadienyl) acetamide which gives N-(2,-3,4,5-diepoxypentyl) acetamide, N-methyl-N-(2,5-cyclohexadienyl) lauramide giving N-methyl-N-(2,3,5,6-diepoxycyclohexyl) lauramide, N,N-diallyl benzamide which gives N,N-di(2,3-epoxypropyl) benzamide, and N-isobutenyl-N-(3-butenyl) myristamide which gives N-(3 - methyl - 2,3 - epoxypropyl) - N - (3,4 - epoxybutyl) myristamide. It will be understood that these examples are illustrative only and that other amides of olefinic amines can be epoxidized, and that other methods can be used to produce the new N-epoxyhydrocarbyl amides of the invention which is not limited to these illustrative examples.

We claim as our invention:

1. An N-epoxyalkyl amide of a polycarboxylic acid having five to thirty-six carbon atoms in the amide molecule and composed of carbon, hydrogen, carbonyl and epoxy oxygen, and amido nitrogen atoms, said epoxy oxygen being linked to adjacent carbon atoms.

2. An N,N'-di(epoxyalkyl) amide of a saturated dicarboxylic acid composed, except for the amido nitrogen and carbonyl and epoxy oxygen atoms, of atoms of carbon and hydrogen and having directly attached to each of the amido nitrogen atoms at least one carbon atom to which no oxygen is directly linked, said epoxy oxygen being linked to adjacent carbon atoms, the amide having from 5 to 36 carbon atoms in the molecular structure.

3. An N,N'-di(2,3-epoxyalkyl) amide of a dicarboxylic acid having from 5 to 36 carbon atoms in the amide molecule.

4. N,N'-di(2,3-epoxypropyl) oxamide.

5. An N-epoxyalkyl amide of an alpha, beta-olefinic dicarboxylic acid having the epoxy oxygen linked to adjacent carbon atoms, and from 5 to 36 carbon atoms in the amide molecule.

References Cited in the file of this patent

UNITED STATES PATENTS

| | | |
|---|---|---|
| 2,131,120 | Schlack | Sept. 7, 1938 |
| 2,469,683 | Dudley | May 10, 1949 |